Inventor:
Alexander J. Yerman,
by Ronald R. Campbell
His Attorney.

United States Patent Office 3,533,149
Patented Oct. 13, 1970

3,533,149
PROCESS FOR INCREASING THE DIELECTRIC STRENGTH OF INSULATING LIQUIDS
Alexander J. Yerman, Scotia, N.Y., assignor to General Electric Company, a corporation of New York
Filed Dec. 18, 1967, Ser. No. 691,546
Int. Cl. H01g 13/00
U.S. Cl. 29—25.41                                    5 Claims

ABSTRACT OF THE DISCLOSURE

The dielectric strength of insulating liquids or oil for products such as capacitors or cables is increased by temporarily applying a high hydrostatic pressure for a sufficient period of time to insure solution of gas pockets on solid particulates and surfaces which can act as nucleation sites for the initiation of voltage breakdown.

---

This invention relates to improving the dielectric strength of insulating liquids, and more particularly to a process for increasing the dielectric strength of insulating liquids by more complete removal of undissolved gases. Insulating liquids processed in this manner are especially useful in electrical products suc has hermetically sealed capacitors and cables.

A significant factor in determining the dielectric strength of insulating liquids or oils is the amount and distribution of free gases including air in the dielectric system under consideration. Free gas can be present in the form of free bubbles, stable gas pockets on entrained solid particles, or gas pockets or patches on the surfaces of the container or other solid objects wetted by the dielectric fluid. While the exact mechanism is not clearly understood at present, there is a considerable body of experimental evidence to indicate that the extent and form of this free gas exerts a considerable effect on the dielectric strength observed. For example if tests are made on carefully degassed samples, an increase in dielectric strength is observed as the gas content of the dielectric is reduced. Also it is a well established fact that filtration of the dielectric fluid to remove small entrained particles is effective in improving dielectric strength even when there is considerable dissolved gas in the fluid. This latter improvement is believed to result because solid particles tend to have small gas pockets which serve as nucleation sites for gas bubble formation during breakdown, and filtering to remove a substantial number of the solid particles remove many of these nucleation sites with a consequent increase in the dielectric strength. Despite careful filtration, however, some of the solid particle contaminants remain so that there are still some potential nucleation sites in the liquid or at any solid surfaces in contact with the liquid.

Accordingly, an object of the invention is to provide a new and improved process for increasing the dielectric strength of insulating liquids by the more complete removal of undissolved gases from the liquid and associated solid surface areas.

Another object is to provide a new and improved method for processing insulating liquids and components filled with dielectric liquids to imvrove the dielectric strength which includes either alone or in combination with other procedures such as using degassed liquids or filtering the degassed liquid to remove a large number of solid particle contaminants, an additional pressurization step to eliminate the gas nucleation sites on the remaining contaminants and/or other solid surfaces in contact with the dielectric liquid.

In accordance with the invention, the method for increasing the dielectric strength of insulating liquids comprises applying a high hydrostatic pressure to the insulating liquid and solid surfaces in contact therewith for a sufficient period of time to drive into solution any free gas pockets on the solid particle contaminants within the liquid and on the solid surfaces in contact therewith which would, if not removed, serve as nucleation sites for formation of gas bubbles during electrical breakdown.

The foregoing and other objects, features, and advantages of the invention will be apparent from the following more particular description of a preferred embodiment of the invention, as illustrated in the accompanying drawing wherein.

Figure 1:
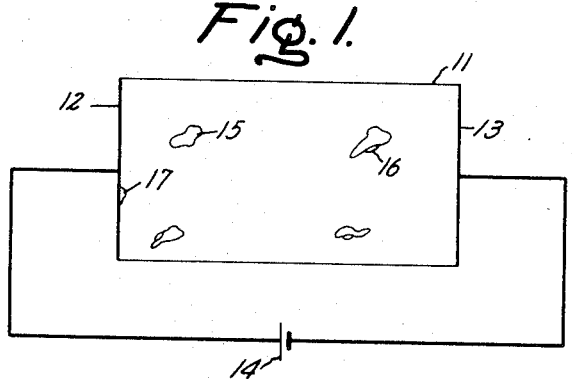
FIG. 1 is a highly magnified diagrammatic view of a sample of insulating liquid between two electrodes across which an electric potential is applied.

The accepted theory is that there are several processes involved when electrical breakdown takes place in an insulating liquid. In the first place, electrons must be introduced into the gap between two electrodes across which an electric potential is applied, and this is effected by emission of electrons from the cathode. The second process involved is that the number of these initial electrons must be adequately multiplied in the bulk of the liquid by some ionization process. Breakdown will then take place either when the total electron yield assumes a critical value, and an electron avalanche is produced which extends across the electrode gap, or when energy input to the liquid results in tensile stresses sufficient to rupture the liquid and therefore greatly increase the proportion of the gas phase present within the electric field. Although theoretically molecular forces of attraction should result in considerable liquid strength in tension, in practice this is seldom realized since there are always present some areas of liquid-gas interface, i,e., nucleation sites. Under tension, these interfaces extend and grow in size up to some critical size at which point they become unstable. They then expand very rapidly to relieve the tension in the fluid by rupture of the fluid column. It is believed that in most practical applications of dielectric fluids, it is the low tensile strength of the dielectric liquid in tension which is the limiting factor, and a cavitation type of failure is responsible for dielectric breakdown. As the electrode gap becomes larger, the size of the avalanche is not as restricted as would be in the case where the gap is relatively small. Therefore, larger gap sizes facilitate the electron multiplication process so that an adequate electron yield to create the avalanche will be possible with a smaller number of initial electrons. Also the probability of finding one or more nucleation sites is increased. For the larger gaps, then, the role of the first process will be of minor importance, while the processes in which the electrons are multiplied and energy is absorbed by the liquid have the dominant effect.

It thus becomes clear that the role of the undissolved air or other gases in the breakdown process becomes important. As the gaseous content of the insulating liquid increases, the stable size of any gas nuclei would tend to grow, and the limiting tensile stress which the liquid would support would decrease. Thus the two parameters which would tend to control dielectric strength in most practical situations would be the concentration of dissolved gases, and the concentration of nucleation sites. Of these, the latter would be the most important in that without the limiting factor nucleation sites, significantly higher tensile strength would be exhibited by the liquid even when it contained a significant amount of dissolved gas. Thus reduction or complete elimination of nucleation sites should give a significant increase in the dielectric strength of the system. A reduction of potential nucleation sites is possible using filtration methods, but not the complete elimination which is desirable. Achievement of the latter is believed to be the basis for the improved dielectric strength achievable with the pressurization treatment described here.

The sketch of FIG. 1 shows schematically an insulating liquid 11 contained between a pair of electrodes 12 and 13 which are connected across a source of electric potential 14 such as a high voltage direct current or suitable alternating current source. The insulating liquid or oil contains a number of solid particle impurities or contaminants 15. Some of these solid particles have tiny gas pockets 16, which are one important type of nucleation site. Another are the gas pockets or patches 17 which exist on the surfaces of the electrodes or other solid surfaces in contact with the dielectric fluid.

It is clear that a carefully filtered insulating liqiud or oil would have a higher dielectric strength than one which is not filtered. As is evident, filtering reduces the concentration of the solid particle contaminants 15, however it is also evident that no matter how careful the filtering, there will still be some remaining solid particle contaminants or impurities, and some of these will contain gas pockets which in general act as preferred nucleation sites. Also, filtration processes exert no control over nucleation sites such as pockets 17 which are largely unaffected. In accordance with the teaching of the invention, an alternate or additional process is carried out on the insulating liquid to substantially eliminate all remaining gas nucleation sites and consequently significantly improve the dielectric strength. This process comprises subjecting the insulating liquid or oil to a high hydrostatic pressure for a predetermined interval of time to drive into solution any gas pockets on the remaining solid particle contaminants remaining in the liquid after filteration, and/or gas patches on any solid surfaces in contact with the dielectric liquid. This method permits reduction of the nucleation sites to a very low level. The high hydrostatic pressure is applied temporarily, but for a sufficient period of time to insure complete solution of all free gas pockets in contact with the liquid. Any suitable technique for applying hydrostatic pressure to a liquid can be employed. An example of one technique is shown in FIG. 2.

Figure 2:
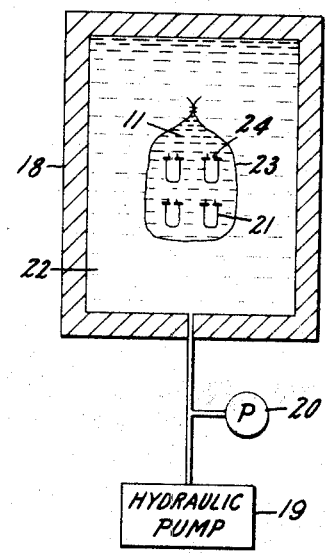
FIG. 2 is a schematic diagram of one arrangement according to the invention for processing electrical components containing an insulating liquid.

The processing equipment in FIG. 2 comprises a suitable high pressure vessel 18 which can be pressurized by a hydraulic pump 19 to some desired pressure which is measured by pressure gage 20. The vessel 18 may be completely filled with the dielectric liquid contained within the electrical components 21, or alternatively the method shown in FIG. 2 may be employed with practical advantage. Here a conventional mineral oil based hydraulic fluid 22 is employed as the pressurizing fluid. It is isolated from the dielectric liquid 11 and the components 21 being treated by a thin nonpermeable membrane 23 which can for example be a polyethylene plastic bag. The components being treated, shown here as capacitors in metal cans, have previously been evacuated and filled with the dielectric liquid through an opening 24 in the case which remains unsealed during the pressurizing treatment in order to equalize the pressure within the case with that outside.

After a pressurization treatment for a prescribed period of time, the system pressure is reduced to atmospheric pressure and the treated components removed from the pressure vessel. They would then ordinarily be sealed in some appropriate fashion which insures against contamination by airborne particles. The improved dielectric strength resulting from the pressure treatment can be expected to remain so long as new sources of contamination do not enter the treated system.

The processing schedule could be expected to vary somewhat depending upon the types of materials in contact with the dielectric liquid, the type of dielectric liquid, and the effectiveness of any other dielectric processing steps employed prior to pressurization. In general, optimum processing conditions would have to be empirically determined for any specific application. Determination of optimum conditions would be particularly important from an economic point of view. Thus, in order to minimize the cost of such treatment it would be desirable that the pressure level and length of exposure time be no higher than necessary. Longer exposure times would not be harmful, but increase processing costs unnecessarily. Also, processing costs would increase significantly as the pressure level was increased.

Figure 3:
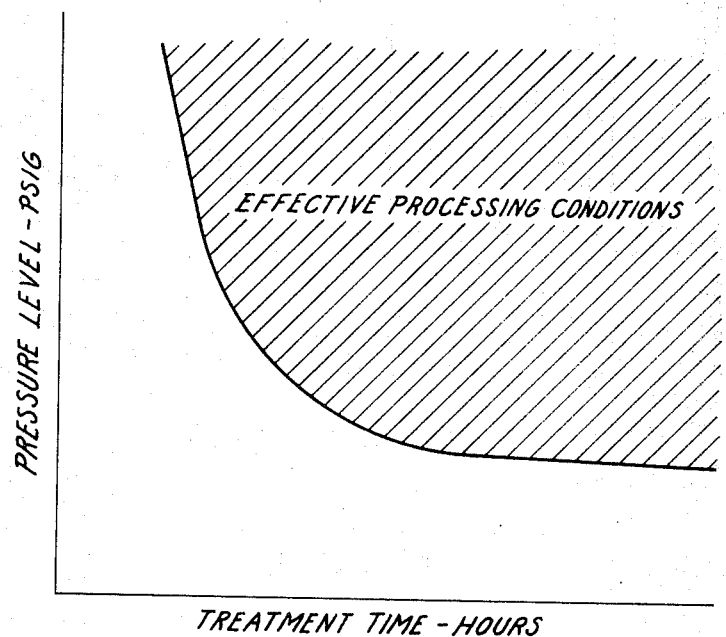
FIG. 3 is a plot of pressure level vs. treatment time illustrating the range of effective processing conditions for the process.

FIG. 3 shows schematically the relationship between pressure level and treatment time required which are expected. Any set of conditions falling within the cross-hatched area would be effective. The specific choice of conditions made would depend primarily on economic considerations as outlined previously. In general, the hydrostatic pressure is greater than 1000 p.s.i.g. and the processing time is less than about ten hours. The pressure treatment can also be performed on a continuous or semicontinuous basis by employing a processing loop in conjunction with a piece of equipment containing a large volume of the dielectric liquid, in which the processing loop contains a small volume of liquid undergoing treatment.

In one example of the capability of the invention, the resistance to breakdown of insulating oil across a spark gap was increased by a factor of at least 4:1 by employing the pressure treatment. The insulating oil and the electrode were subjected to 20,000 p.s.i. pressure for a half-hour period. Upon removal of the pressure, the breakdown voltage or dielectric strength was found to have increased significantly. Direct current potential of up to 6000 volts were were applied across the horizontal 0.007 inch gap without obtaining breakdown. A hydrocarbon mineral oil was used as the insulating liquid, and no atempt had been made to clean, purify, or degas the oil. On untreated oil, i.e., oil which was not subjected to this pressure treatment, breakdown occured at 1500 volts.

Significant improvement in the dielectric strength of insulatnig liquids have a pronounced effect on the size and cost and/or performance of a large number of electrical products using insulating liquids. Insulating liquids or oils treated in this manner, however, have their greatest utility in relatively small electrical products which are hermetically sealed to prevent further contamination by impurities and to keep the treated liquid out of contact with air and other gases which would tend to dissolve in the treated liquid over a period of time. Hermetically sealed capacitors and cables are examples of the electrical products which benefit by employing insulating liquid treated in this manner.

While the invention has been particularly shown and described with reference to a preferred embodiment thereof, it will be understood by those skilled in the art that various changes in form and details may be made therein without departing from the spirit and scope of the invention.

What I claim as new and desired to secure by Letters Patent of the United States is:

1. A process for increasing the dielectric strength of insulating liquids which comprises temporarily applying a high hydrostatic pressure greater than about 1,000 p.s.i.g. for less than about 10 hours to the insulating liquid and solid surfaces in contact therewith in a non-gaseous envirnoment for a sufficient period of time to drive into solution the free gas pockets on solid particle contaminants within the liquid and on the solid surfaces in contact with the liquid, whereby the concentration of nucleation sites which tend to initiate dielectric failure under a high voltage stress by formation of gas bubbles during electrical breakdown is reduced.

2. The process as defined in claim 1 wherein the insulating liquid is contained within the solid surfaces of the body of an electrical component, and the high hydrostatic pressure is applied to both the body of the electrical component and the insulating liquid contained therein.

3. The process as defined in claim 1 wherein the insulating liquid is contained within the solid surfaces of the body of an electrical capacitor, and the high hydrostatic pressure is supplied to both the body of the capacitor and the insulating liquid contained therein.

4. A process for increasing the dielectric strength of insulating liquids which comprises immersing in a pressure applying liquid an enclosed pressure-transmitting container completely filled with the insulating liquid and at least one electrical component body, temporarily applying a high hydrostatic pressure to the pressure applying liquid, and consequently to the insulating liquid and electrical component body, for a sufficient period of time to drive into solution the free gas pockets on solid particle contaminants within the insulating liquid and on the surfaces of the electrical component body in contact with the insulating liquid, and removing the pressure-transmitting container from the pressure applying liquid.

5. A process as defined in claim 4 wherein the insulating liquid is filtered to remove some solid particle contaminants before filling the pressure-transmitting container and applying the high hydrostatic pressure.

References Cited

UNITED STATES PATENTS

| Re. 5,569 | 9/1873 | Armstrong. | |
| 739,443 | 9/1903 | Pertz. | |
| 2,252,313 | 8/1941 | Bostock | 261—140 |
| 2,743,091 | 4/1956 | Day et al. | 261—140 XR |
| 3,335,343 | 8/1967 | Moore et al. | 29—25.42 XR |

OTHER REFERENCES

"Insulating Materials for Design and Engineering Practice," by Frank M. Clark; especially pp. 133 and 152.

JOHN F. CAMPBELL, Primary Examiner

RICHARD B. LAZARUS, Assistant Examiner

U.S. Cl. X.R.

55—84